Patented Feb. 18, 1930

1,748,011

UNITED STATES PATENT OFFICE

WILLIAM D. DOOLEY, OF CHICAGO, ILLINOIS

ELECTROLYTE FOR RECTIFIERS, CONDENSERS, AND THE LIKE AND METHOD OF MAKING THE SAME

No Drawing.     Application filed July 18, 1927.  Serial No. 206,697.

This invention relates to a compound for use as an electrolyte in electrolytic devices, such as rectifiers, condensers, lightning arresters and the like.

More particularly, this invention relates to certain electrolytes which form highly resistant films on the surfaces of film-forming metals, as aluminum, tantalum, magnesium, etc., when such metals are immersed in these electrolytes and subjected to an electric current. As is well understood by those skilled in the art, these film-forming metals possess the property of allowing a current to flow from an electrolyte to them with small opposition but strongly oppose a current flowing from them to an electrolyte.

An object of the present invention is the production of an electrolyte which will be stable and one which can be utilized for various current values.

While, as before stated, this improved electrolyte is applicable for use in all types of electrolytic devices, it is of special value for use in rectifiers and condensers of the type disclosed in my co-pending application Serial No. 206,698, filed July 18th, 1927.

Experimentation has shown that an electrolyte containing the following ingredients is adaptable for such use:

Sodium silicate (water glass).
Sodium hydroxide.
Gelatine (or other colloid).
Distilled water.

As a practical example, in preparing the electrolyte for use in an alternating current rectifier as disclosed in my above identified co-pending application for use in rectifying the normal 110 volt A. C. 60 cycles house lighting current, I use 30% sodium silicate, 5% sodium hydroxide, 5% gelatine and 60% distilled water. Instead of sodium hydroxide, it will be understood that potassium hydroxide may be employed. The electrolyte is a neutral solution and the hydrogen ion concentration is regulated to give the neutral value of 7.0.

The hydroxide used keeps the silicate in a suspended or dispersed state in the distilled water and does not allow it to settle and form a solid mass.

The gelatine or other colloid such as agar-agar, albumen or gum arabic causes the electrolyte to jellify, which not only prevents evaporation, but also keeps the sodium silicate in suspension throughout the entire mass. The gelatine has a further action in that it tends to increase and accelerate the film-forming properties of the electrodes when a current is passed through the cell. A film of vaseline or other heavy petroleum product is floated on the upper surface of the electrolyte to prevent evaporation.

Such an electrolyte as I have described has proven, during the course of much experimentation, to be superior to those found in the prior art, as it forms a film on the film-forming electrode which is highly resistant and does not break down except under very heavy voltages.

Having thus described my invention, what I desire to claim and secure by Letters Patent is:

1. An electrolyte consisting of sodium silicate, sodium hydroxide, gelatine and water.

2. An electrolyte consisting of 30% sodium silicate, 5% sodium hydroxide, 5% gelatine and 60% water.

In testimony whereof I hereunto affix my signature.

WILLIAM D. DOOLEY.